Patented Mar. 22, 1938

2,112,222

UNITED STATES PATENT OFFICE 2,112,222

METHOD OF MANUFACTURING PIGMENTS DISPERSED IN OIL

Arthur John Schroeder, Cincinnati, Ohio, assignor to Interchemical Corporation, a corporation of Ohio No Drawing. Application September 21, 1933
Serial No. 690,444

6 Claims. (Cl. 134—58)

This invention relates to a method of manufacturing pigments dispersed in oil, and to the product thereof.

Pigments dispersed in oil are used as the basic material in the manufacture of printing inks, oil paints, and similar commercial products. The expression "oil color" is sometimes applied to some of these commercial products, but is used herein for the sake of brevity as a general expression synonymous with "pigment dispersed in oil".

Pigments are ordinarily manufactured by precipitation in an aqueous solution, so that when first made they are suspended in, and wet with, water. The manufacture of oil colors, therefore, involves separation of a pigment from water and the dispersion thereof in oil. Two methods are in use for this purpose.

One method consists in drying wet color cakes formed by filtration from the color suspension, and then grinding the dry color cakes with oil on an attrition mill. A disadvantage of this method is that the pigment particles, which were precipitated in a highly dispersed state, agglomerate in the dry cake, so that even after grinding there are likely to be gritty agglomerations of pigment particles in the oil color produced. This is a serious disadvantage when the oil color is to be used in the manufacture of printing ink.

The second method, termed flushing, consists in bringing oil into contact with the pigment while the pigment is still wet with, or even suspended in, water. This is usually accomplished by agitating wet color cakes with oil. This causes the pigment to take up the oil and give up water which rises to the surface of the mixture, while the pigment and oil settle as a curd-like mass. It has also been proposed to disperse oil in a water suspension of the pigment, and emulsifiers such as Turkey red oil have been used to assist such dispersion. In this case also, the pigment becomes dispersed in the oil and is contained in an oil curd which may be separated from the water by filtration. A disadvantage of the flushing method is that a substantial amount of water remains more or less permanently emulsified in the oil curd containing the pigment, so that removal of this water by evaporation in a vacuum or otherwise is necessary to produce an oil color free from water. A further disadvantage, in cases where an emulsifier has been used to effect a dispersion of oil in a water suspension of the pigment, is that the emulsifier tends to make the emulsion stable, so that the separation of the oil curd from the water takes place very slowly.

The method which I have invented overcomes these disadvantages and permits the rapid production of oil colors so free from water that little, if any, water need be evaporated from them in order to make them useful in the manufacture of printing inks and oil paints.

My method consists in the manufacture of oil colors from pigments suspended in water by emulsifying in the water suspension a quantity of oil sufficient to form an oil color with the suspended pigment, and then immediately breaking the emulsion by chemical means to allow rapid setting of an oil curd containing the pigment. The emulsion is broken either by destroying the effect of the emulsifier used in making the emulsion, or by precipitating a water-repellant substance in the emulsion, or most desirably by doing both of these things at the same time.

In a preferred method of carrying out my invention, I use a soluble soap as an emulsifier to form an emulsion of oil in the water in which the pigment is suspended. This results in an immediate intimate contact between the pigment particles and the oil particles. I then immediately add a precipitant for the emulsifier which destroys its effect as an emulsifier and precipitates it in the oil particles as a water-repellant insoluble soap. This breaks the emulsion, allowing the settling of an oil curd containing the pigment and substantially free from water. The insoluble soap is, of course, also contained in this curd, but it is present only in a small quantity, and in no way affects the use of the curd as an oil color for the production of printing inks and paints. I have found mineral salts to be most desirable as precipitants for the emulsifier. It is, of course, necessary to select the salt of a mineral base which will not react with, or alter the color of, the particular pigment dealt with. I have found that barium, calcium, magnesium, aluminum, strontium, and lead salts are satisfactory. As the emulsifier I may use any soluble soap which may be precipitated by a mineral salt. This includes sodium and potassium soaps of oleic acid, stearic acid, ricinoleic acid, resin, or other organic acid capable of forming an insoluble soap when combined with a mineral salt.

A further feature of my invention, which greatly facilitates its use, consists in emulsifying the oil in the water suspension of the pigment by first making an emulsion of the oil in a separate quantity of water in which the emulsifier is dissolved, and then introducing this emulsion into the tub containing the water suspension of the pigment. The oil thus introduced being already emulsified in water is immediately dispersed throughout the water in which the pigment is suspended. The oil thus added in the form of an emulsion may be of any kind suitable in an oil color. It is usually a drying oil, such as linseed oil or lithographic varnish. The quantity of the oil is preferably approximately that required to form a printing ink body with the pigment suspended in the tub. This quantity of oil is very much less than the quantity of water in which the pigment is suspended, and may be less than the quantity of water in which the oil is emulsified before being added to the suspension in the tub. The quantity of emulsifier used is only a small fraction of the quantity of oil.

Specific examples of methods embodying my invention are given for the purpose of illustration:

Example I

A common dry color is known as Para Toner. It is made by coupling diazotized paranitraniline with beta naphthol. In a tub of suitable size there is prepared by any well known formula 100 pounds of this color and the color is kept stirring and in suspension while the balance of the operation is carried out. The concentration of color in the tub may amount to approximately 1-pound in 3-gallons of water, or any other normal concentration in which such a color may be produced in the dry color works. To this suspension of color there is added 100-pounds of a thin linseed varnish such as that commonly sold in the market as number "0" Lithographic varnish, emulsified in a solution of 5-pounds of sodium oleate (the soluble soap) dissolved in 400-pounds of water. This is stirred into the mass in the tub, and the emulsion disperses itself throughout the mass, forming a uniform dispersion of the pigment in an emulsion of oil and soluble soap. There is now added to the tub 5-pounds of barium chloride dissolved in 50-pounds of water. The reaction between the barium chloride and sodium oleate is practically instantaneous to form the water insoluble barium oleate and the resulting insoluble soap causes the emulsion to break and the pigment is then immediately wetted by the oil so that the whole mass of pigment, oil and barium oleate separate in curd-like masses and constitute a dispersion primarily of pigment in oil suitable for the manufacture of ink or paint. Separation is readily performed by discharging the mass upon a filter box or other suitable filter equipment. The curd is then finished by further additions of oil and other components for conversion into commercial products or, if desired, is dried in steam jacketed mixers. In certain instances vacuum may be unnecessary.

Example II

There is suspended in a dry color tub a quantity of the pigment dyestuff commonly known as Lithol Red R. This suspension may be made either from commercial paste dyestuff or by coupling Tobias acid with beta naphthol in the usual manner for its production to the amount of something less than 100 pounds.

The dyestuff is then laked by the addition of barium chloride to form the barium salt to the extent of 100 pounds. The excess of barium chloride is then washed out. To this suspension of the barium lake of Lithol Red R there is then added 100 pounds of thin linseed varnish which has been emulsified in a solution of 5-pounds of sodium oleate dissolved in about 400-pounds of water as in Example I. A further addition of barium chloride to the extent of 5-pounds now forms barium oleate which breaks the emulsion and causes the entire mass of color to curd and separate as described in Example I.

Example III

There is prepared in a tub by the union of sodium ferricyanide and iron sulfate followed by oxidation with any suitable oxidizing agent according to known processes, 100-pounds of blue pigment of the order commonly known as Prussian blue. The blue is allowed to settle and washed once or twice by decantation or until the suspension of color in the tub has been adjusted to a proper pH value for flushing, 6–7:2. There is then added to the suspension of blue 100-pounds of thin lithographic varnish which has been emulsified in 5-pounds of sodium resinate dissolved in 400-pounds of water. The mass is then thoroughly agitated so that the sodium resinate and oil is emulsified throughout the color mass. There is then added sufficient magnesium sulfate to convert the resin entirely into magnesium resinate which is an insoluble metallic soap. The emulsion then breaks and the entire mass of color separates cleanly in a curd-like mass which may be treated in any manner desired as above described.

I may vary the process by adding the emulsion of oil to the suspension of pigment to which I have already added the metallic salt which will precipitate the soap. This is of advantage in working with a color which is precipitated as an alkaline earth salt such as barium lithol. In this case the color need not be washed at all and the excess barium chloride present over that required for the conversion of the dyestuff into the barium lake would be used to convert the soluble soap to the insoluble barium soap thus bringing about the curding effect. Also it may be desirable to form the insoluble soap and lake the dyestuff with the same metallic salt simultaneously, in which case the emulsion of oil in soap would be added to the solution of dye and then a metal salt which is a precipitant for both the dye and the soap would be added.

There are further variations of my process which are obvious to those skilled in the art. Certain colors change shade or are commonly said to "develop upon heating to temperatures between 50 and 100° C." Thus Para Toner deep, a shade of Para Toner made by the use of beta naphthol monosulfonic acid F 2:7 changes from a very yellow shade in undertone to a very blue shade in undertone at temperatures around 70° C. or slightly higher. It is obvious that these color developments could not be brought about by my process under normal conditions since the reaction for formation of the insoluble soap, and the curding effect take place at fairly low or room temperatures. However, these color developments may be easily carried out as a part of my invention by heating the resulting curd in steam jacketed dough mixers until the development temperature has been reached and with or without the removal of the last trace of water under vacuum as may be desired.

What I claim is:

1. The improvement in the method of manufacturing an oil color from a wet pigment by emulsifying the pigment and water with oil and breaking the emulsion to separate the oil and pigment from the water, which consists in using a water-soluble soap to make the emulsion and in converting said water-soluble soap into a water-insoluble soap to cause the separation.

2. The method of manufacturing an oil color from a wet pigment, which comprises forming an emulsion containing the pigment, water, oil and a soluble soap amounting to a small fraction of the amount of the pigment, and converting said soluble soap into an insoluble soap by reaction with a water-soluble mineral acid salt to break the emulsion and cause the oil, pigment and insoluble soap to separate from the water.

3. The method of manufacturing an oil color from a wet pigment, which comprises forming an emulsion containing the pigment, water, oil and a soluble alkali-metal soap amounting to a small fraction of the amount of the pigment, and reacting said soap with a water-soluble mineral acid salt of a metal whose water-soluble mineral acid salts are nonreactive with the pigment, to form an insoluble, water-repellant soap, to break the emulsion and to cause the oil, pigment and insoluble soap to separate from the water.

4. The method of manufacturing an oil color from a wet pigment, which comprises forming an emulsion containing the pigment, water, oil and a soluble alkali-metal soap amounting to a small fraction of the amount of the pigment, and reacting said soap with a neutral water-soluble alkaline-earth salt of a mineral acid to form an insoluble, water-repellant, alkaline-earth soap, to break the emulsion and to cause the oil, pigment and insoluble soap to separate from the water.

5. The method of manufacturing an oil color, which comprises forming an emulsion containing a dye solution from which a pigment may be precipitated as an alkaline-earth salt, oil and a soluble alkali-metal soap amounting to a small fraction of the amount of the oil, and then adding a water-soluble alkaline-earth salt of a mineral acid to precipitate pigment from the dye solution and to react with said soluble soap to form an insoluble, water-repellant, alkaline-earth soap, whereby the emulsion is broken and the oil, precipitated pigment and insoluble soap are caused to separate from the water.

6. The method of manufacturing an oil color from a wet pigment, which comprises emulsifying the oil with water by means of a soluble alkali-metal soap, mixing the resulting emulsion with the wet pigment, in such proportions that the soluble soap amounts to only a small fraction of the amount of the pigment, and converting said soluble soap into an insoluble soap by reaction with a water-soluble salt of a metal adapted to convert said soluble soap to an insoluble soap and thus break the emulsion and cause the oil, pigment and insoluble soap to separate from the water.

ARTHUR JOHN SCHROEDER.